United States Patent
Lee et al.

(10) Patent No.: US 11,405,623 B2
(45) Date of Patent: Aug. 2, 2022

(54) IMAGE ENCODER, IMAGE DECODER, AND IMAGE PROCESSING METHOD

(71) Applicant: SAMSUNG ELECTRONICS CO., LTD., Suwon-si (KR)

(72) Inventors: Wonseok Lee, Suwon-si (KR); Yunseok Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/891,852

(22) Filed: Jun. 3, 2020

(65) Prior Publication Data

US 2021/0136391 A1 May 6, 2021

(30) Foreign Application Priority Data

Oct. 31, 2019 (KR) .................. 10-2019-0138201

(51) Int. Cl.
*H04N 7/12* (2006.01)
*H04N 19/182* (2014.01)
(Continued)

(52) U.S. Cl.
CPC ......... *H04N 19/182* (2014.11); *H04N 19/105* (2014.11); *H04N 19/136* (2014.11); *H04N 19/46* (2014.11)

(58) Field of Classification Search
CPC .... H04N 19/182; H04N 19/186; H04N 19/59; H04N 5/367; H04N 19/105; H04N 19/136; H04N 19/184; H04N 19/103; H04N 19/124; G06T 5/002; G06T 7/90; G06T 11/001; G06T 2207/10024; G06T 2207/20016; G06T 7/248; G06T 7/74; G06T 7/77
(Continued)

(56) References Cited

U.S. PATENT DOCUMENTS 6,233,358 B1   5/2001  Acharya
8,244,049 B2   8/2012  Lee et al.
(Continued)

FOREIGN PATENT DOCUMENTS

JP   2007-259306 A   10/2007
JP   2009-71472 A    4/2009
(Continued)

*Primary Examiner* — Masum Billah
(74) *Attorney, Agent, or Firm* — Sughrue Mion, PLLC

(57) ABSTRACT

An image encoder configured to process a Bayer image generated by passing through a color filter of a Bayer pattern includes: a detector configured to read the Bayer image in units of blocks and search for, in the blocks, a target pixel to be compressed and a plurality of candidate pixels which are located adjacent to the target pixel; a flag generator configured to compare a first pixel value of the target pixel with second pixel values based on pixel values of the plurality of candidate pixels, identify a reference pixel based on a comparison result, and generate a flag indicating relative direction information between the target pixel and the reference pixel; and a compressor configured to encode information corresponding to a comparison method applied by the flag generator and the comparison result and output the encoded information as a bitstream together with the flag.

20 Claims, 19 Drawing Sheets

(51) Int. Cl.
*H04N 19/46* (2014.01)
*H04N 19/105* (2014.01)
*H04N 19/136* (2014.01)

(58) Field of Classification Search
USPC .......................................................... 375/240
See application file for complete search history.

(56) References Cited

U.S. PATENT DOCUMENTS

2017/0118491 A1\*   4/2017   Togita .................. H04N 19/186
2019/0373189 A1    12/2019   Lee
2020/0275096 A1\*   8/2020   Rath ...................... H04N 19/11

FOREIGN PATENT DOCUMENTS

| JP | 2009071472 A | \* | 4/2009 |
| JP | 2009-194760 A | | 8/2009 |
| JP | 2009194760 A | \* | 8/2009 |
| KR | 10-2009-0037578 A | | 4/2009 |

\* cited by examiner

FIG. 10

| Mode | Category | Shift G | Shift R/B |
|---|---|---|---|
| 0 | DPCM | 0 | 0 |
| 1 | DPCM | 1 | 1 |
| 2 | DPCM | 2 | 2 |
| 3 | DPCM | 2 | 3 |
| 4 | DPCM | 3 | 3 |
| 5 | DPCM | 3 | 4 |
| 6 | DPCM | 4 | 4 |
| 7 | DPCM | 4 | 5 |
| 8 | DPCM | 5 | 5 |
| 9 | DPCM | 5 | 6 |
| 10 | PCM | 6 | 6 |

IMAGE ENCODER, IMAGE DECODER, AND IMAGE PROCESSING METHOD

CROSS-REFERENCE TO RELATED APPLICATION

This application is based on and claims priority from Korean Patent Application No. 10-2019-0138201, filed on Oct. 31, 2019, in the Korean Intellectual Property Office, the disclosure of which is incorporated herein in its entirety by reference.

BACKGROUND

The disclosure relates to an electronic device, and more particularly, to an image encoder, an image decoder, and an image processing method.

Image encoding (or image compression) may refer to an operation of generating, from original image data, encoded (or compressed) image data having a smaller size than that of the original image data. In addition, image decoding (or image decompression) may refer to an operation of generating restored image data by decoding encoded (or compressed) image data or an encoded bitstream. The restored image data may be the same as or different from the original image data, according to an encoding and decoding method.

Recently, as dual cameras are mounted on various electronic devices or the number of images which may be captured per second increases, the size of image data stored in an electronic device increases.

SUMMARY

The disclosure provides an image encoder and an image decoder to which a compression method considering an edge is applied to prevent image quality deterioration. The image quality deterioration may occur when compressing a Bayer image including an edge, which is an area in which a difference between a pixel value of a target pixel and pixel values of pixels adjacent to the target pixel is large.

According to an aspect of the disclosure, there is provided an image encoder comprising: a detector configured to: read a Bayer image in units of blocks, and search for, in the blocks, a target pixel to be compressed and a plurality of candidate pixels which are located adjacent to the target pixel; a flag generator configured to: compare a first pixel value of the target pixel with second pixel values of the plurality of candidate pixels, identify a reference pixel based on a comparison result, and generate a flag indicating relative direction information between the target pixel and the reference pixel; and a compressor configured to: encode information corresponding to a comparison method applied by the flag generator and the comparison result, and output the encoded information as a bitstream together with the flag.

According to another aspect of the disclosure, there is provided an image decoder configured to process a bitstream including information corresponding to a Bayer image, the image decoder comprising: a flag detector configured to detect a flag indicating relative direction information between a target pixel which is a target to be compressed and a reference pixel selected from a plurality of candidate pixels located adjacent to the target pixel; and a decompressor configured to decode the bitstream to generate a restored pixel with respect to the target pixel, wherein the reference pixel has a first pixel value, among the plurality of candidate pixels, closest to a second pixel value of the target pixel, and wherein the decompressor is further configured to restore the target pixel by identifying a pixel corresponding to a position of the reference pixel as a restored reference pixel, based on the flag.

According to another aspect of the disclosure, there is provided an image processing method comprising: searching, on a Bayer image, for a target pixel and a plurality of candidate pixels located adjacent to the target pixel; comparing the target pixel with the plurality of candidate pixels; identifying, among the plurality of candidate pixels, a reference pixel most similar to the target pixel, based on a comparison result; generating a flag indicating relative direction information between the target pixel and the reference pixel; and encoding the comparison result, wherein the Bayer image is compressed based on the flag and the encoded comparison result.

BRIEF DESCRIPTION OF THE DRAWINGS

Embodiments of the disclosure will be more clearly understood from the following detailed description taken in conjunction with the accompanying drawings in which:

FIG. 10 is a table illustrating information with respect to encoding modes which may be used in an electronic device, according to an example embodiment of the disclosure;

DETAILED DESCRIPTION OF THE EMBODIMENTS

The disclosure will now be described more fully with reference to the accompanying drawings, in which example embodiments of the disclosure are shown.

Figure 1:
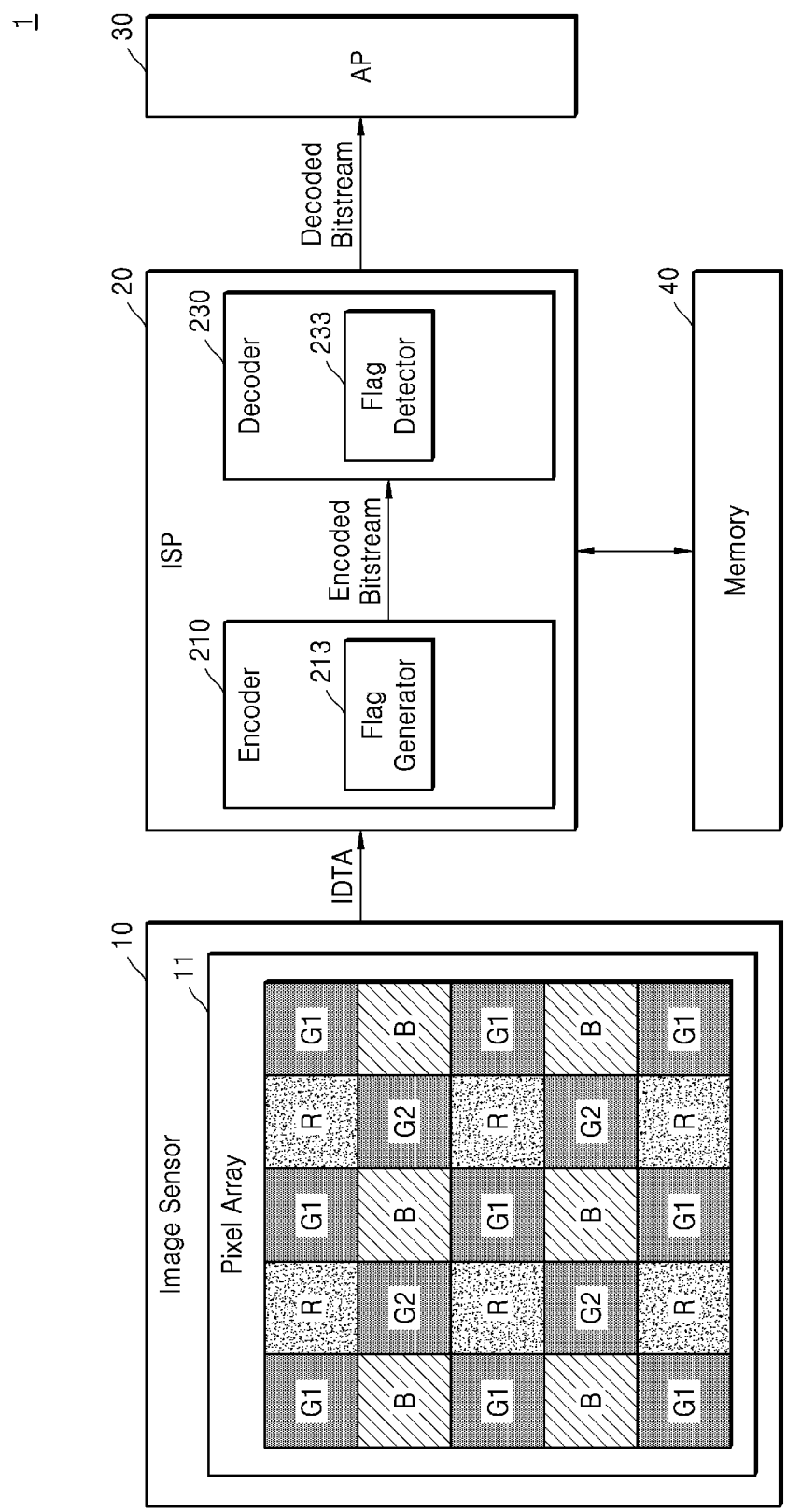
FIG. 1 is a block diagram of an electronic device according to an example embodiment of the disclosure.

FIG. 1 is a block diagram of an electronic device 1 according to an example embodiment of the disclosure. Referring to FIG. 1, the electronic device 1 may include an image sensor 10, an image signal processor 20, an application processor 30, and a memory 40.

The electronic device 1 is an imaging device capable of capturing and/or storing an image of a subject by using a solid-state image sensor, such as a charge-coupled device and a complementary metal oxide semiconductor (CMOS), or the like. For instance, the electronic device 1 may include a digital camera, a digital camcorder, a mobile phone, a tablet computer, or a portable electronic device. Portable electronic devices may include laptop computers, mobile phones, smartphones, tablet personal computers (PC), personal digital assistants (PDA), enterprise digital assistants (EDA), digital still cameras, digital video cameras, audio devices, portable multimedia players (PMP), personal navigation devices (PND), MP3 players, handheld game consoles, e-books, wearable devices, or the like. In addition, the electronic device 1 may be mounted on an electronic device such as a drone, an advanced driver assistance system (ADAS), or the like, or may be mounted on an electronic device provided as a component in a vehicle, furniture, a manufacturing equipment, a door, various measuring devices, or the like.

The image sensor 10 may convert an optical signal of a subject, incident through an optical lens, into an electrical signal, and generate and output image data IDTA based on the electrical signal. The image sensor 10 may be mounted on an electronic device having an imaging function or a light-sensing function. For example, the image sensor 10 may be mounted on an electronic device, such as a camera, a smartphone, a wearable device, an Internet of Things (IoT) device, a tablet PC, a PDA, a PMP, a navigation device, a drone, an ADAS, or the like. In addition, the image sensor 10 may be mounted on an electronic device provided as a component in a vehicle, furniture, a manufacturing equipment, a door, various measuring devices, or the like. The image sensor 10 may sense a subject captured through a lens under a control of the image signal processor 20 or the application processor 30.

The image sensor 10 may include a pixel array 11 and a plurality of modules capable of processing received optical signals from the pixel arrays 11. The plurality of modules may include additional components capable of processing optical signals or improving image sensing sensitivity, for example, a row driver, a ramp signal generator, a timing generator, an analog-to-digital converter, a readout circuit, or the like.

The pixel array 11 may include a plurality of row lines, a plurality of column lines, a plurality of pixels each connected to the plurality of row lines and the plurality of column lines and arranged in a matrix form, and at least one color filter arranged to respectively correspond to the plurality of pixels.

Each of the plurality of pixels may include a light-sensing element and may sense light by using the light-sensing element and convert the sensed light into a pixel signal, which is an electrical signal. For example, the light-sensing element may include a photo diode, a photo transistor, a photo gate, a pinned photo diode (PPD), or a combination thereof. Each of a plurality of light-sensing elements may include a four-transistor structure including a photo diode, a transfer-transistor, a reset-transistor, an amplifying-transistor, and a selection-transistor. According to an embodiment, each of the plurality of light-sensing elements may include a one-transistor structure, a three-transistor structure, a five-transistor structure, or a structure in which the plurality of pixels share some transistors.

The image sensor 10 may pass through color filter to obtain original pixel data from an optical signal. The original pixel data may indicate a pixel value of an original pixel. At least one color filter may be arranged to respectively correspond to the plurality of pixels in the pixel array 11 and may function as a filter which transmits only a particular wavelength of light entering via the light-sensing element of the image sensor 10. One pixel may include a plurality of sub-pixels. Each of the plurality of sub-pixels may operate as a unit cell processing one color, and at least one color filter may include a structure corresponding to each of the plurality of sub-pixels. Hereinafter, the term "pixel" is used as a unit cell processing one color without distinguishing the pixel from the sub-pixel.

At least one color filter may be applied in a form of a Bayer color filter. A Bayer pattern is based on a premise that human eyes obtain most of the luminance data from a green component of a subject. Half of the pixels included in the Bayer color filter detect a green signal, one fourth of the remaining pixels detect a red signal, and one fourth of the remaining pixels detect a blue signal. According to an embodiment, a Bayer color filter may include a structure in which cells with a size of 2×2 including a red R pixel, a blue B pixel, and two green G pixels are repeatedly arranged. According to another embodiment, the Bayer color filter may have a structure in which cells with a size of 2×2 including a red R pixel, a blue B pixel, and two wide green W pixels are repeatedly arranged. That is, a method of red, green, and blue (RGB) color filters in which a green filter is arranged in two pixels among four pixels, and a blue filter and a red filter are arranged in the remaining two pixels is often adopted. In addition to the method of the RGB color filter, a method of cyan, yellow, green, and magenta color filters in which cyan, yellow, green, and magenta color filters are respectively arranged in four pixels is also adopted. In addition, a method of cyan, yellow, magenta, and key (CYMK) color filters may be applied. At least one color filter may be regarded as configuring one color filter layer.

The original pixel data or a set of original pixel values generated through at least one color filter may be referred to as a Bayer image. Herein, the Bayer image is distinguished from a color filter physically transmitting a particular wavelength of light, and may be an image in which an image sensed by the image sensor 10 corresponds to a conceptual image shape identified in the image signal processor 20, the application processor 30, or an user environment. In other words, the Bayer image may indicate image data including pixel information of a completed image which is treated by a processing unit in the electronic device 1.

The readout circuit may generate raw data based on an electrical signal provided from the pixel array 11 and output, as the image data IDTA, the raw data or the raw data of which a pretreatment such as removal of a bad pixel or the like is performed. The image sensor 10 may be implemented as a semiconductor chip or package including the pixel array 11 and the readout circuit.

The image signal processor 20 may receive the image data IDTA, which is an output signal of an output buffer, and may process/treat an image, such that the image may be viewed by humans, and output the processed/treated image to a display. Alternatively, the image signal processor 20 may receive a control signal from an external host through a PC interface (PC I/F) and provide the processed/treated image to the external host.

The image signal processor 20 may perform image processing on the image data IDTA. For example, the image signal processor 20 may perform image processing to change a data format with respect to the image data IDTA (for example, changing the image data of the Bayer pattern to a YUV or RGB format), and image processing to improve image quality such as noise reduction, brightness adjustment, sharpness adjustment, or the like. The image signal processor 20 may be configured as a hardware of the electronic device 1. Although the image signal processor 20 is illustrated separately from the image sensor 10 in FIG. 1, the disclosure is not limited thereto. The image signal processor 20 may be included in the image sensor 10 or may be included in the application processor 30.

The image signal processor 20 may include an image encoder 210 and an image decoder 230. The image encoder 210 may encode the image data IDTA and output a result of the encoding as an encoded bitstream. The image decoder 230 may decode an input encoded bitstream and output a result of the decoding as a decoded bitstream to the application processor 30. The image signal processor 20 may perform a read and write operation on the memory 40 and store data during the encoding and decoding of the image data IDTA. The image encoder 210 may include a flag generator 213, and the image decoder 230 may include a flag detector 233.

Although the image encoder 210 is illustrated as directly delivering a bitstream to the image decoder 230 in FIG. 1, the disclosure is not limited thereto. For instance, a bitstream output from the image encoder 210 may be input to another image decoder and a bitstream generated by another image encoder may be input to the image decoder 230. That is, the encoded image data may not be decoded immediately after encoding. For example, referring to FIG. 11, a bitstream generated by an image encoder 210a may be stored in a memory 40. When decoding is required, an image decoder 230a may receive the bitstream stored in the memory 40 and decode image data.

The image encoder 210 may compress the image data IDTA corresponding to the original pixel data obtained through the Bayer color filter to reduce the size of the Bayer image. A Bayer image may refer to original pixel data of a Bayer pattern obtained through a color filter. Since the original pixel data is pixel data or a pixel value of a pixel to be a target to be compressed, the original pixel data may be referred to as a pixel value of a target pixel. In other words, the term "original pixel" may be mutually used with the term "target pixel". According to an embodiment of the disclosure, the image encoder 210 may use candidate pixel data to generate encoded data with respect to the original pixel data. An operation of generating the encoded data with respect to the original pixel data by using the candidate pixel data will be described in detail with reference to FIGS. 3 to 8B.

The image encoder 210 may include the flag generator 213. The flag generator 213 may generate a flag including relative direction information of the original pixel (the target pixel to be compressed) and a reference pixel selected from a plurality candidate pixels, of the image data IDTA to be processed in the image encoder 210. The flag may be a value obtained by numbering with the relative direction information of the target pixel and the reference pixel or a value obtained by mapping with a particular bit.

When a subject is captured, a difference in pixel values between the target pixel to be compressed and a candidate pixel which is adjacent to the target pixel or a reference pixel may occur. Due to the big difference in the pixel values, a case may occur where an image sensed by the image sensor 10 is relatively smaller in size than other surrounding subjects and a spot pixel having large contrast of brightness or color, a bad pixel which is a sensing error of the image sensor 10, an edge pixel which is an edge portion of the Bayer image, or the like occurs. When such a case occurs, since the candidate pixel to be reference for compression may have a large difference from neighboring pixels, the compression rate may be reduced or image quality may deteriorate. Accordingly, compression needs to be performed considering a case in which a large difference in pixel values between the target pixel and other adjacent pixels occurs, and the deterioration of the image quality may be prevented when a flag is considered in performing compression. An operation of generating a flag and an operation of applying the flag in the encoding and decoding will be described in detail with reference to FIGS. 3, 4, 5, 6A, 6B, 7A, 7B, 8A and 8B.

The image decoder 230 may receive encoded data (that is, a bitstream) generated from the image encoder 210 and generate decoded data by performing decoding on the received encoded bitstream. The image decoder 230 may output the decoded data as a decoded bitstream to the application processor 30. The image decoder 230 may perform, in an reverse order, a series of operations performed by the image encoder 210 to encode the image data IDTA to restore the original pixel corresponding to the original Bayer image. In other words, the image decoder 230 may restore the image data IDTA compressed through the image encoder 210. Detailed operations of the image decoder 230 will be described below with reference to FIGS. 4 and 5.

The image decoder 230 may include the flag detector 233. The flag detector 233 may detect the flag generated by the flag generator 213 to obtain the relative direction information of the target pixel and the reference pixel selected from the candidate pixels. The image decoder 230 may restore the target pixel with only relatively little data based on the obtained relative direction information. Detailed operations of the image decoder 230 and the flag detector 233 will be described below with reference to FIGS. 4 and 5.

The application processor 30 may be a central processing unit (CPU), a microprocessor, or a micro controller unit (MCU). The application processor 30 may perform post-processing on the decoded bitstream received from the image decoder 230. The post-processing may refer to an application of an image enhancement algorithm with respect to image artifacts. For example, the application processor 30 may perform, with respect to the received decoded bitstream, white balancing, denoising, demosaicking, lens shading, gamma corrections, or the like, but the disclosure is not limited thereto.

The memory 40 may store processing data received from the image signal processor 20 and provide the processing data to the image signal processor 20 or other components of the electronic device 1.

The memory 40 may include a volatile memory or a nonvolatile memory. The volatile memory may include dynamic random access memory (DRAM), static RAM (SRAM), or the like, and the nonvolatile memory may include read only memory (ROM), programmable ROM (PROM), electrically programmable ROM erasable programmable ROM (EPROM), electrically erasable and programmable ROM (EEPROM), flash memory, phase-change RAM (PRAM), resistive RANI (RRAN), ferroelectric RAM (FRAM), or the like.

Modules of each of the image sensor 10, the image signal processor 20, and the application processor 30 illustrated in FIG. 1 may be implemented by one processor, and each of the modules may be independently implemented by different processors. Hereinafter, 'pixel' or 'pixel value' may refer to a value in which a signal corresponding to an optical signal input through the light-sensing element on the pixel array 11 is rearranged on the Bayer image. Hereinafter, 'original pixels' or 'target pixels' may refer to pixel values of unit original pixels to be currently encoded or decoded in an image. Hereinafter, 'candidate pixels' may refer to pixel values of pixels to be reference for encoding the original pixels. Hereinafter, 'restored pixels' may refer to pixel values of restored pixels generated by decoding the encoded data of the original pixels.

Figure 2:
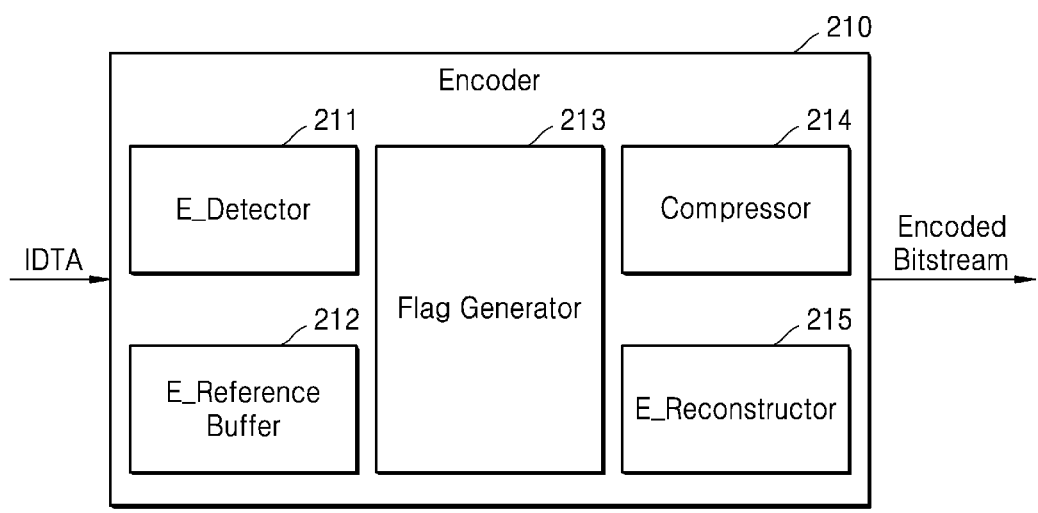
FIG. 2 is a block diagram of an image encoder according to an example embodiment of the disclosure.

FIG. 2 is a block diagram of the image encoder 210 according to an example embodiment of the disclosure. FIGS. 1 and 2 are referred together.

An E_detector 211 may receive the image data IDTA generated by the image sensor 10. The E_detector 211 may encode a Bayer image in units of blocks based on the received image data IDTA and search for a target pixel to be compressed and a plurality of candidate pixels which are located adjacent to the target pixel. In addition, the E_detector 211 may detect an abnormal situation such as a bad pixel and a spot pixel on the Bayer image and identify whether the pixel is defective. In addition, the E_detector 211 may use information about a candidate pixel restored in an E_reconstructor 215 and stored in an E_reference buffer 212 when encoding a next target pixel after an already encoded target pixel. In other words, previously encoded target pixels may be used as a candidate pixel compressing or encoding the next target pixel.

The flag generator 213 may compare a pixel value of the target pixel with a pixel value of each of the plurality of candidate pixels and identify, as the reference pixel, a candidate pixel having the smallest value among comparison results generated by the number of candidate pixels. A difference operation may be performed as a comparison method, but is not limited thereto. For instance, a difference between a pixel value of the target pixel with a pixel value of each of the plurality of candidate pixels is separately calculated. A result of the difference operation between the pixel value of the target pixel and the pixel value of the reference pixel may be separately encoded and included in a bitstream as information for encoding and decoding. In addition, the information with respect to a comparison method of the target pixel and the reference pixel may also be separately encoded and included in the bitstream, and the flag generator 213 may generate a flag which is relative direction information of the target pixel and the reference pixel.

A compressor 214 may perform encoding with respect to the comparison method between the target pixel and the reference pixel, a comparison result thereof, and a flag, and may include, in the bitstream, a result of performing the encoding. The bitstream may be a contiguous set of encoded bits. That is, the compressor 214 may generate a bitstream including information with respect to the target pixel and the reference pixel. In other words, the compressor 214 may perform a function of compressing the Bayer image.

The E_reconstructor 215 may restore encoded data output from the compressor 214 to generate candidate pixels. The E_reconstructor 215 may directly store a restored pixel in the E_reference buffer 212 or store the restored pixel separately in a memory.

Figure 3:
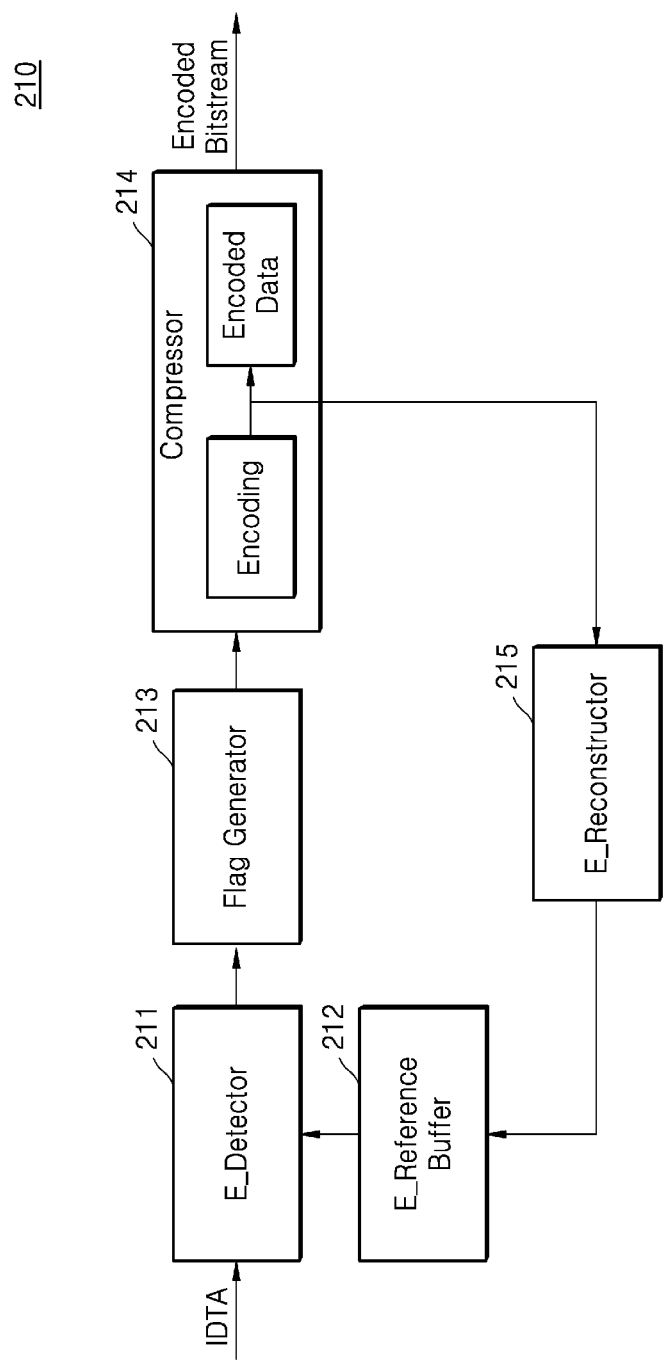
FIG. 3 is a block diagram illustrating in detail an image encoder according to an example embodiment of the disclosure.

FIG. 3 is a block diagram illustrating in detail the image encoder 210 according to an example embodiment of the disclosure. FIGS. 1 to 3 are referred together.

The image encoder 210 may include the E_detector 211, the E_reference buffer 212, the flag generator 213, the compressor 214, and the E-reconstructor 215. The image encoder 210 may include a central processor which collectively controls the E_detector 211, the E_reference buffer 212, the flag generator 213, the compressor 214, and the E_reconstructor 215. Alternatively, each of the E_detector 211, the E_reference buffer 212, the flag generator 213, the compressor 214, and the E_reconstructor 215 may be operated by its own processor, and the image encoder 210 may operate as a whole as the processors operate organically with each other. Alternatively, the E_detector 211, the E_reference buffer 212, the flag generator 213, the compressor 214, and the E_reconstructor 215 may be controlled under a control of an external processor of the image encoder 210. Since the image encoder 210 shown in FIG. 2 is the same as the image encoder 210 described in FIG. 1, redundant description thereof will be omitted.

Referring to FIGS. 1 and 2, the image encoder 210 may compress the image data IDTA received from the image sensor 10 to reduce an amount of data information. For example, the image encoder 210 may compress the Bayer image corresponding to the image data IDTA in units of blocks. The blocks may be a two-dimensional array arrangement, such as a 3×3 structure, in which three pixels are respectively arranged in length and breadth, a 5×5 structure, or a 1×8 structure, which is a set of eight pixels arranged side by side in a row. The image encoder 210 may compress the image data IDTA in units of blocks. Herein, the 3×3, 5×5, and/or 1×8 structure, which is a structure of blocks, indicating the number of pixels in the length and breadth are merely an example for convenience of description and are not limited to the disclosed structure.

The image encoder 210 may compress the image data IDTA by comparing the target pixel, which is a target to be compressed, with the plurality of candidate pixels which are located adjacent to the target pixel on the Bayer image.

The E_detector 211 may encode the Bayer image in units of blocks and search for, from the blocks, the target pixel to be compressed and the plurality of candidate pixels which are located adjacent to the target pixel. The number of pixels to be processed at one time may vary depending on a size of the blocks. In addition, the E_detector 211 may detect an abnormal situation (for example, a bad pixel) in the Bayer image. The bad pixel may include a static bad pixel caused by physical errors or failures on the image sensor 10 and a dynamic bad pixel caused by irregularities.

The E_detector 211 may compare pixel values or signal levels of the plurality of candidate pixels in a horizontal direction around the target pixel to be a detection target to identify whether the target pixel is included in an edge area of an entire image and identify whether a target pixel of detection is defective when the target pixel is not included in the edge area. In this case, the E_detector 211 may detect the bad pixel by comparing the signal levels of the candidate pixels located around the target pixel. For example, when the signal level or pixel value of the candidate pixels in a right-side direction around the target pixel among the plurality of candidate pixels located in the horizontal direction around the target pixel has a great difference from the pixel value of the target pixel, the E_detector 211 may identify the right side of the target pixel as an edge. In addition, the E_detector 211 may perform, with respect to a pixel identified as a bad pixel, tagging attribute information indicating the bad pixel. The attribute information may include a spot having a relatively small size and having a large contrast of brightness or color, information related to the edge pixel which is an edge portion on the Bayer image, or the like.

The flag generator 213 may compare the pixel value of the target pixel with the pixel value of each of the plurality of candidate pixels and search for a candidate pixel having the smallest value among comparison results generated by the number of candidate pixels, and identify the found candidate pixel as a reference pixel. According to an embodiment of the disclosure, the comparison method may be performed by the difference operation. In other words, the pixel value of the target pixel and the pixel values of the plurality of candidate pixels are differentiated and the candidate pixel having the smallest pixel value difference from the target pixel may be identified as the reference pixel. A result of the difference operation of the pixel value of the target value and the pixel value of the reference pixel may be included in the bitstream as the information for encoding and decoding. In addition, information related to the comparison method of the target pixel and the reference pixel may also be included in the bitstream.

The flag generator 213 may generate the flag which is the relative direction information of the target pixel and the reference pixel. The generated flag may also be separately included in the bitstream. According to an embodiment of the disclosure, as the relative direction information of the target pixel and the reference pixel is additionally included in the bitstream, data loss of image quality deterioration when decoding encoded data may be prevented. Referring to FIGS. 1 and 2, the image decoder 230 that receives the encoded bitstream further including the flag may identify which pixel among the plurality of candidate pixels is selected as the reference pixel based on the flag. According to an embodiment, the image decoder 230 that receives the encoded bitstream further including the flag may immediately identify which pixel among the plurality of candidate pixels is selected as the reference pixel based on the flag. That is, the image decoder 230 may restore the pixel value of the target pixel based on the reference pixel identified by the relative direction information of the reference pixel and the target pixel, without including a separate detector or again undergoing the comparison operations of the plurality of candidate pixels. Accordingly, power consumed in the comparison operations of the candidate pixels may be reduced. In addition, image quality deterioration may also be prevented.

In the disclosure, for convenience of explanation, although the difference operation is described as an example of the comparison operation, various operation methods may be applied without being limited thereto. In addition, the method of comparing the target pixel with each of the plurality of candidate pixels is not limited to the method disclosed in the disclosure, various comparison methods, such as a comparison between an average of the pixel values of some of the plurality of candidate pixels, may be applied.

The compressor 214 may perform encoding on the information with respect to the comparison method between the target pixel and the reference pixel and the comparison result. According to an embodiment of the disclosure, the compressor 214 may generate a bitstream including the encoded data with respect to the target pixel based on one of the encoding modes with respect to the comparison method. In other words, the compressor 214 may generate a bitstream including a header area configured by information with respect to an encoded comparison method, a flag area configured by the flag, and a compression area configured by an encoded comparison result.

The compressor 214 may include the comparison result, which is a difference in the pixel values of the target pixel and the reference pixel, in the compression area of the bitstream. When the comparison result is larger than a memory size allocated to the compression area, data loss, that is, image quality deterioration may occur in compressing the image data IDTA. Accordingly, an optimal reference pixel should be selected to minimize the comparison result to prevent image quality deterioration. For example, the compressor 214 may, to prevent image quality deterioration, perform a bit-shift with respect to the encoded comparison result included in the compression area to adjust the size of data to match the allocated memory size.

The compressor 214 may output the encoded bitstream to the E_reconstructor 215 to again decode the encoded target pixel. In addition, the compressor 214 may output the encoded image data as the encoded bitstream.

A differential pulse code modulation (DPCM) mode in which encoding is performed based on a difference value between a value of each of the target pixels and a reference value identified from at least one reference pixel, an average mode in which encoding is performed based on an average value of values of the original pixels, or the like may be included in the encoded modes. A target pixel already encoded may be used as a candidate pixel to be used in the DPCM mode, and information with respect to the candidate pixel to be used in the DPCM mode as the encoded target pixel may be stored in the E_reference buffer 212.

The E_reconstructor 215 may restore encoded data output from the compressor 214 to generate the candidate pixels. Referring to a pixel that has already been encoded indicates not using the target pixel, that is, the original pixel, as a candidate pixel with respect to a next target pixel but using the decoded pixel after encoding the original pixel. Referring to FIGS. 1 and 2, all of the original pixel information with respect to a previous target pixel and the target pixel and information with respect to a pixel in which the target pixel is encoded and decoded are present in the image encoder 210, but original information with respect to the target pixel is not present in the image decoder 230. In other words, when a previous original pixel is used as a candidate pixel in the image encoder 210, since the image decoder 230 does not have information of the original pixel with respect to the previous target pixel referred by the image encoder 210, an error occurs in a restored result, and thus, an inconsistency may occur between the image encoder 210 and the image decoder 230. Therefore, a pixel that restores again the previously encoded target pixel may be used. The E_reconstructor 215 may store the restored pixels in a memory. Alternatively, the E_reconstructor 215 may directly store the restored pixels in the E_reference buffer.

The E-reference buffer 212 may extract information with respect to at least one candidate pixel for encoding current original pixels from a memory. Alternatively, the E_reference buffer 212 may use the information with respect to the restored pixel stored by the compressor 214. The candidate pixels may be neighborhood pixels located around the original pixels. According to an embodiment, the E_reference buffer 212 may be configured as line memories storing pixel values of neighborhood pixels of target pixels required for encoding the original pixels. According to an embodiment, the E_reference buffer 212 may include a volatile memory such as DRAM or SRAM, but is not limited thereto.

The E_reference buffer 212 may store a pixel value of a block including an encoded target pixel corresponding to a restored image. Based on the pixel values stored in the E_reference buffer 212, the image encoder 210 may perform a bit-shift with respect to a comparison result exceeding the size allocated to the bitstream to reduce an amount of information such that the comparison result matches the size allocated to the bitstream. A bit-shift operation will be described in detail with reference to FIG. 14.

Figure 4:
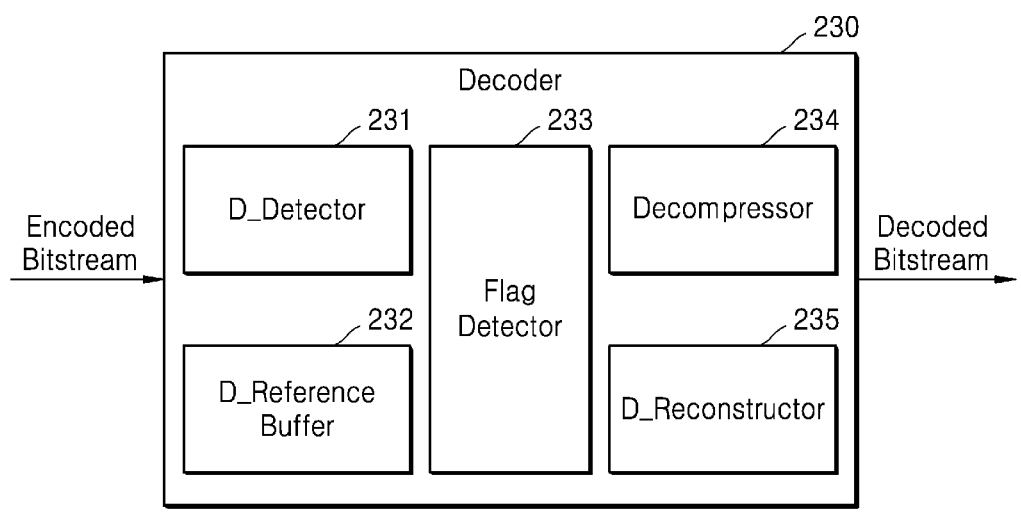
FIG. 4 is a block diagram of an image decoder according to an example embodiment of the disclosure.

FIG. 4 is a block diagram of the image decoder 230 according to an example embodiment of the disclosure. The image decoder 230 shown in FIG. 4 illustrates a detailed embodiment of the image decoder 230 of FIG. 1. Accordingly, although omitted below, descriptions of the image decoder 230 in FIG. 1 may also be applied to the image decoder 230 of FIG. 4.

The image decoder 230 may include a D_detector 231, a D_reference buffer 232, a flag detector 233, a decompressor 234, and a D-reconstructor 235. The image decoder 230 may include a central processor which collectively controls the D_detector 231, the D_reference buffer 232, the flag detector 233, the decompressor 234, and the D_reconstructor 235. Alternatively, each of the D_detector 231, the D_reference buffer 232, the flag detector 233, the decompressor 234, and the D_reconstructor 235 may be operated by its own processor, and the image decoder 230 may be operated as a whole as the processors operate organically with each other. Alternatively, the D_detector 231, the D_reference buffer 232, the flag detector 233, the decompressor 234, and the D_reconstructor 235 may be controlled under a control of an external processor of the image decoder 230. The D_detector 231, the D_reference buffer 232, and the D_reconstructor 235 in the image decoder 230 shown in FIG. 4 corresponds to the E_detector 211, the E_reference buffer 212, and the E_reconstructor 215 in the image encoder 210 of FIG. 1, therefore redundant descriptions thereof will be omitted.

The flag detector 233 may detect the flag in the bitstream to restore the relative direction information of the target pixel and the reference pixel.

The decompressor 234 may decode the bitstream received from the image encoder 210 to identify the comparison method of the target pixel and the reference pixel, and generate restored pixels based on the identified comparison method.

The bitstream decoded by the decompressor 234 may include bit-shift operation information included in the header area and with respect to the encoded comparison result performed based on the size allocated to the compression area. The bit-shift operation information may further include the number of times performing the bit-shift operation and a sign of the encoded comparison result. As described above, the bit-shift operation is an operation reducing an amount of information of the image data.

The image decoder 230 may identify the number of times performing the bit-shift operation and the sign of the comparison result based on the encoded header area and may apply the comparison method of the target pixel and the reference pixel in the generating of a restored pixel.

Figure 5:
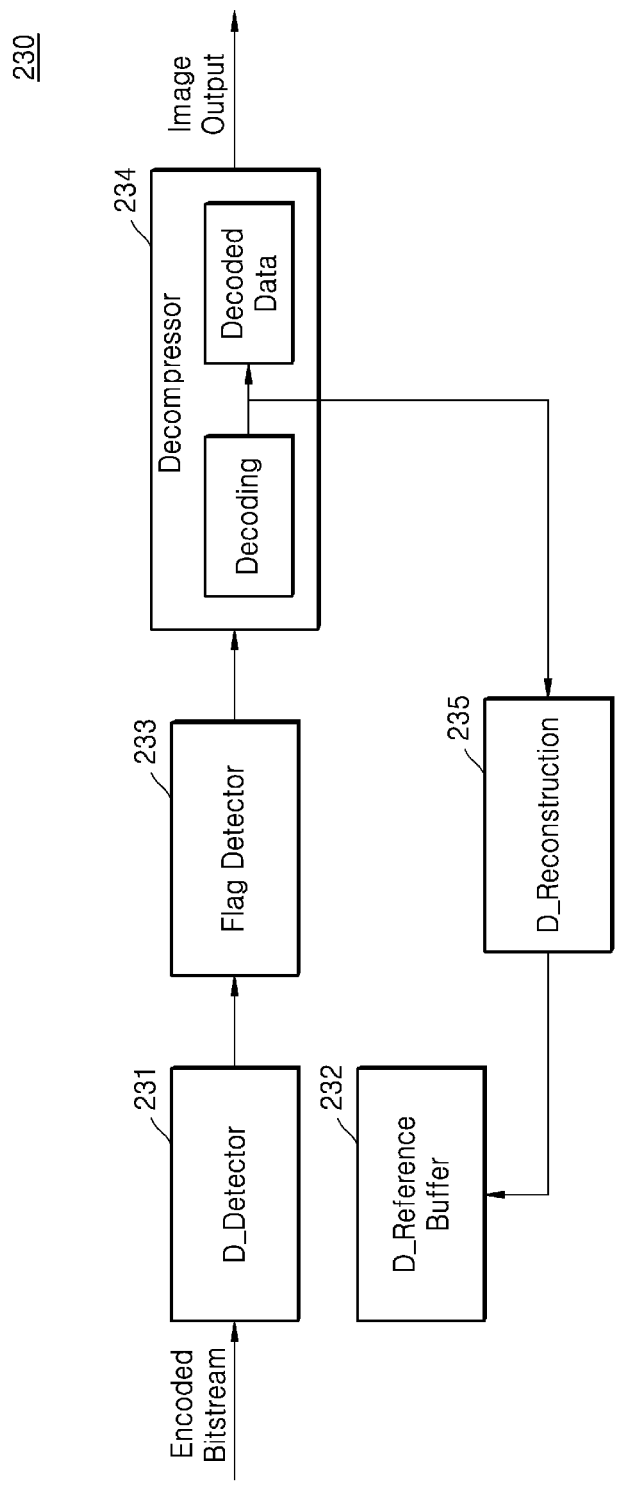
FIG. 5 is a block diagram illustrating in detail an image decoder according to an example embodiment of the disclosure.

FIG. 5 is a block diagram illustrating in detail the image decoder 230 according to an example embodiment of the disclosure. FIGS. 1, 3, and 4 are referred together. Descriptions in common between FIGS. 1, 3, and 4 will be omitted. The D_detector 231, the D_reference buffer 232, and the D_reconstructor 235 in the image decoder 230 shown in FIG. 5 corresponds to the E_detector 211, the E_reference buffer 212, and the E_reconstructor 215 in the image encoder 210 of FIG. 2 and are the same as the D_detector 231, the D_reference buffer 232, and the D_reconstructor 235 in the image decoder 230 of FIG. 4, therefore redundant descriptions thereof will be omitted.

The image decoder 230 may decode the encoded bitstream received from the image encoder 210 to restore the Bayer image based on compressed data information. For example, the image decoder 230 may restore the compressed Bayer image in units of blocks. The blocks correspond to the blocks of the structure used in the image encoder 210. For example, when the blocks of the 1×8 structure which is a set of eight pixels arranged side by side in one row is used in the image encoder 210, the blocks of the same 1×8 structure may be also used in the image decoder 230.

The flag detector 233 according to an embodiment of the disclosure may immediately detect a pixel corresponding to the reference pixel based on the restored relative direction information and as a result, may generate a restored pixel in which the pixel value of the target pixel is restored. Since the flag detector 233 may immediately identify which pixel was used as the reference pixel when compressing the Bayer image through the flag, a separate detector detecting a candidate pixel is not needed. In addition, since a separate detector is not needed, power consumed to detect which of the plurality of candidate pixels is used as the reference pixel may be reduced.

According to an embodiment of the disclosure, the decompressor 234 may parse information included in the header area of the received bitstream and identify the comparison method with respect to the original pixels based on the parsed information. The decompressor 234 may decode the bitstream and output a result of decoding in a form of a decoded bitstream.

FIGS. 6A, 6B, 7A, 7B, 8A and 8B are diagrams comparing a pixel value of a target pixel with pixel values of candidate pixels in a Bayer image according to an example embodiment of the disclosure. Hereinafter, FIGS. 1 to 5 are referred together. FIGS. 6A, 6B, 7A, 7B, 8A and 8B illustrate a relationship between green pixels including the relative direction information of the target pixel and the reference pixel on the Bayer image. The Bayer image based on the image data IDTA may be encoded and decoded in units of blocks of a 5×5 structure. For convenience of explanation, only pixels located in two lines upwardly, downwardly, leftwardly, and rightwardly adjacent to the target pixel are illustrated in FIGS. 6A to 8B, but is not limited thereto.

Figure 6A:
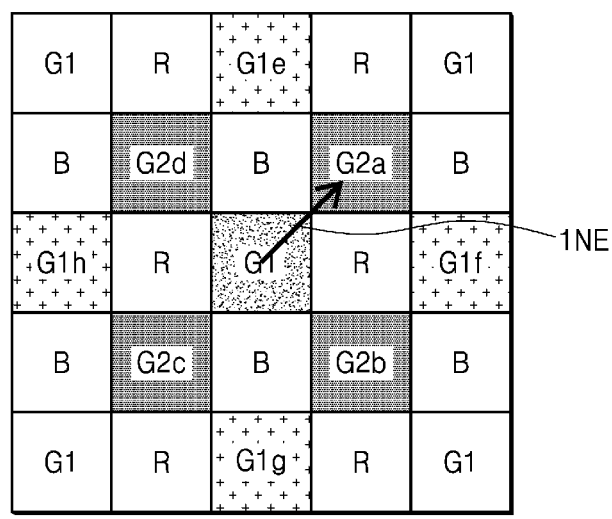
FIGS. 6A and 6B are diagrams comparing a pixel value of a target pixel with pixel values of a candidate pixels in a Bayer image according to an example embodiment of the disclosure.

Referring to FIG. 6A, the middle of the blocks, i.e., G1, is the target pixel to be a target to be compressed, a plurality of candidate pixels G2a, G2b, G2c, and G2d generated by passing through a color filter same as a color filter that the target pixel passes through and located diagonally adjacent to the target pixel are illustrated.

The E_detector 211 of the image encoder 210 may search for the target pixel and the plurality of candidate pixels in the Bayer image. The flag generator 213 may compare the target pixel with each of the plurality of candidate pixels G2a to G2d and identify, as the reference pixel, the candidate pixel G2a having the smallest comparison value among a plurality comparison results. When the reference pixel is identified, the flag generator 213 may generate a flag indicating the relative direction information of the target pixel and the reference pixel. For example, when the flag generator 213 uses a difference as a comparison method, information corresponding to the difference as a comparison method, a differential value of the target pixel and the reference pixel G2a, a flag corresponding to an 'adjacent northeast side 1NE' as the relative direction information of the target pixel and the reference pixel may be included in a bitstream through the compressor 214. The image decoder 230 may decode an encoded bitstream to restore the information that the difference is used as the comparison method and the differential value of the target pixel and the reference pixel G2a. In addition, the flag indicating "the reference pixel used in the compression of the target pixel is located on the 'adjacent northeast side 1NE" based on the target pixel may be obtained without a detector structure at the image decoding to generate a restored pixel in which the target pixel is restored.

Figure 6B:
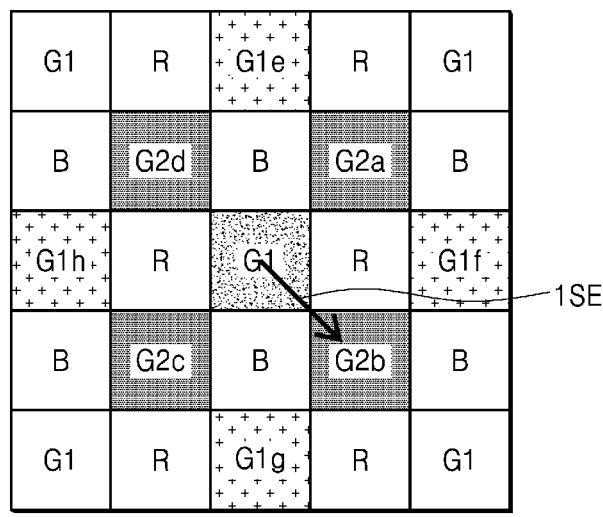

FIG. 6B is a diagram illustrating a case where the pixel G2a selected as the reference pixel in FIG. 6A is assumed as a bad pixel.

Generally, since a spatial correlation exists between the target pixel to be a target to be compressed and the plurality of candidate pixels adjacent to the target pixel, the pixel value of the target pixel and the pixel values of the plurality of candidate pixels are similar. However, in the cases of an edge, a spot pixel, or a bad pixel corresponding to a corner of the Bayer image, a difference between the pixel value of the target pixel and a pixel value of at least one of the plurality of candidate pixels may be large. For instance, the difference between the pixel value of the target pixel and the pixel value of at least one of the plurality of candidate pixels may be larger than a threshold value. According to an embodiment of the disclosure, when compression is performed by using the flag, data loss, that is, image quality deterioration may be minimized even in the cases of the edge, the spot pixel, and the bad pixel.

Referring to FIG. 6B, the flag generator 213 may compare the target pixel with each of the plurality of candidate pixels G2a, G2b, G2c, and G2d and identify, as the reference pixel, the candidate pixel G2b having the smallest comparison value among a plurality comparison results. In addition, the flag generator 213 generates a flag corresponding to an 'adjacent southeast side 1SE'. The image decoder 230 may use the comparison method, the comparison results, and the flag related to the "adjacent southeast side 1SE" to use the flag indicating "the reference pixel used in the compression of the target pixel is located on the "adjacent southeast side 1SE" based on the target pixel" to generate a restored pixel. Therefore, even in a case where a bad pixel is generated, a restoring based on adaptive direction information may be performed and image quality deterioration may be prevented.

In the related art, a reference pixel is restored by considering the reference pixel in a fixed direction or a pixel having the smallest pixel value difference is detected through a separate detector structure. According to an embodiment of the disclosure, the image decoder 230 may use the flag generated by the image encoder 210 to restore the target pixel.

Figure 7A:
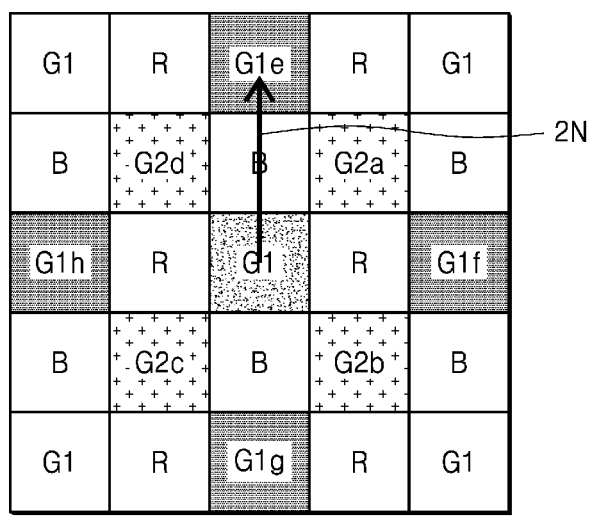
FIGS. 7A and 7B are other diagrams comparing a pixel value of a target pixel with pixel values of candidate pixels in a Bayer image according to an example embodiment of the disclosure.
Figure 7B:
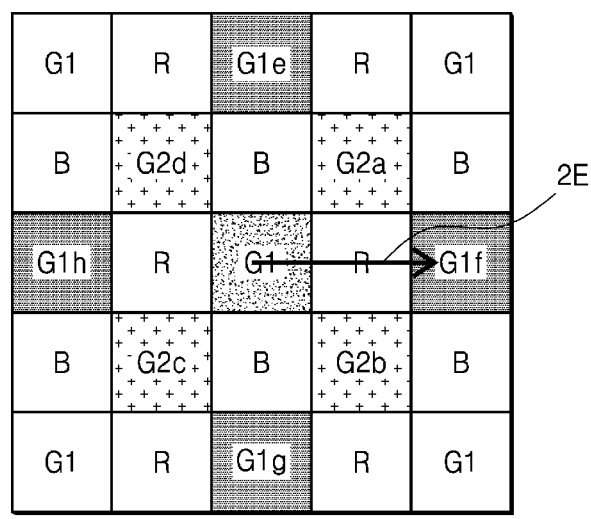

FIGS. 7A and 7B are other diagrams comparing a pixel value of a target pixel with pixel values of candidate pixels in a Bayer image according to an example embodiment of the disclosure.

Referring to FIGS. 7A and 7B, the middle of the blocks, i.e., G1, is the target pixel to be a target to be compressed, the plurality of candidate pixels G2a, G2b, G2c, and G2d adjacent to the target pixel and a plurality of candidate pixels G2e, G2f, G2g, and G2h adjacent to the target pixel, which are generated by passing through a color filter that is the same as a color filter that the target pixel pass through, are illustrated.

In detecting the plurality of candidate pixels, in addition to the plurality of candidate pixels G2a, G2b, G2c, and G2d right adjacent to the target pixel, the E_detector 211 may select the plurality of candidate pixels G2e, G2f, G2g, and G2h which are spaced one cell as a pixel unit apart from the target pixel and located in a horizontal or vertical direction of the target pixel to use in compression. The E_detector 211 may select the plurality of candidate pixels G2e, G2f, G2g, and G2h and even when the plurality of candidate pixels G2e, G2f, G2g, and G2h are not right adjacent to the target pixel.

Referring to FIG. 7A, the flag generator 213 may compare the target pixel with each of the plurality of candidate pixels G2e, G2f, G2g, and G2h and identify, as the reference pixel, the candidate pixel G1e having the smallest comparison value among a plurality of comparison results. The flag generator 213 may generate a flag indicating the relative direction information of the target pixel and the reference pixel based on the identified reference pixel. For example, when the flag generator 213 uses a difference as a comparison method, information corresponding to the difference as a comparison method, a differential value of the target pixel and the reference pixel G1e, and a flag corresponding to a 'north side 2N spaced one cell away from the target cell' as the relative direction information of the target pixel and the reference pixel may be included in the bitstream through the compressor 214. The image decoder 230 may decode an encoded bitstream to restore the information that the difference is used as the comparison method and the differential value of the target pixel and the reference pixel G1e. In addition, the flag indicating "the reference pixel used in the compression of the target pixel is located on the 'north side 2N spaced one cell away' based on the target pixel may be obtained without a detector structure in the image decoding to generate a restored pixel in which the target pixel is restored.

FIG. 7B is a diagram illustrating a case where the pixel G1e selected as the reference pixel in FIG. 7A is assumed as an edge case. That is, it is assumed that an edge of the Bayer image is formed on an upper portion of the target pixel.

The flag generator 213 may compare the target pixel with each of the plurality of candidate pixels G2e, G2f, G2g, and G2h and identify, as the reference pixel, the candidate pixel G1f having the smallest comparison value among a plurality of comparison results. In addition, the flag generator 213 may generate a flag corresponding to an 'east side 2E spaced one cell away from the target cell'. The image decoder 230 may use the a comparison method, the comparison results, and a flag corresponding to an 'east side 2E spaced one cell away from the target pixel' to use the flag indicating "the reference pixel used in the compression of the target pixel is located on the 'east side 2E spaced one cell away' based on the target pixel" to generate a restored pixel. Therefore, even in an edge case, a restoring based on adaptive direction information may be performed and image quality deterioration may be prevented.

Figure 8A:
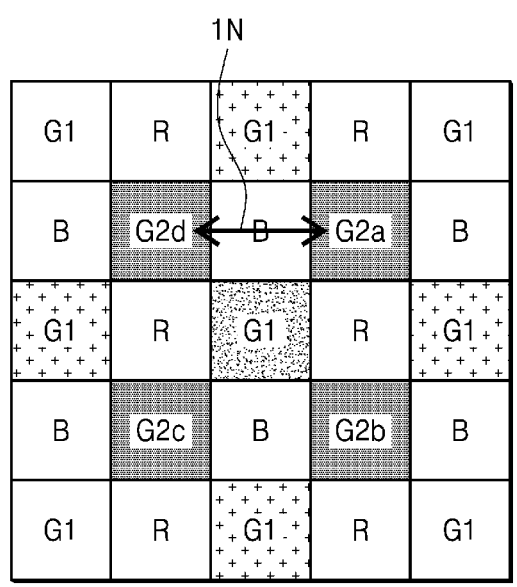
FIGS. 8A and 8B are other diagrams comparing a pixel value of a target pixel with pixel values of candidate pixels in a Bayer image according to an example embodiment of the disclosure.
Figure 8B:
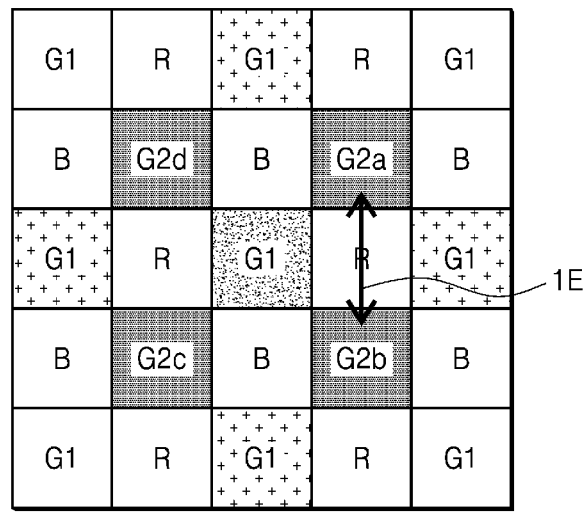

FIGS. 8A and 8B are diagrams illustrating comparing a pixel value of a target pixel with pixel values of candidate pixels in a Bayer image according to an example embodiment of the disclosure.

FIGS. 8A and 8B are diagrams illustrating comparing at least two average values of a plurality of candidate pixels with a target pixel, without individually comparing a pixel value of the plurality candidate pixels with the target pixel.

Referring to FIG. 8A, the flag generator 213 may compare the target pixel with each of the average values G2a and G2b, G2b and G2c, G2c and G2d, G2d and G2a of two pixels of a plurality of candidate pixels G2a to G2d and identify, as the reference pixel, a midpoint of a pair of candidate pixels G2d and G2a corresponding to an average pixel value having the smallest comparison value among a plurality of comparison results. When the reference pixel is identified, the flag generator 213 may generate a flag indicating the relative direction information of the target pixel and the reference pixel. For example, when the flag generator 213 uses a difference as a comparison method, information corresponding to 'a difference with respect to an average' as the comparison method, a difference value pf the target pixel and the reference pixel which is the midpoint of the pair of candidate pixels G2d and G2a, and a flag corresponding to an 'adjacent north side 1N' as the relative direction information of the target pixel and the reference pixel may be included in a bitstream through the compressor 214. The image decoder 230 may decode an encoded bitstream to restore the information that the difference with respect to the average is used as the comparison method and the differential value of the target pixel and the reference pixel which is the midpoint of the pair of candidate pixels G2d and G2a, In addition, the flag indicating "the reference pixel used in the compression of the target pixel is located on the 'adjacent north side 1N' based on the target pixel may be obtained without a detector structure at the image decoding to generate a restored pixel in which the target pixel is restored.

Referring to 8B, the pixel which is the midpoint of the pair of pixels G2d and G2a selected as the reference pixel in FIG. 8A is assumed as a bad pixel or an edge case. The flag generator 213 may compare the target pixel with each of the average values G2a and G2b, G2b and G2c, G2c and G2d, G2d and G2a of two pixels of the plurality of candidate pixels G2a to G2d and identify, as the reference pixel, a midpoint of a pair of candidate pixels G2a and G2b corresponding to an average pixel value having the smallest comparison value among a plurality of comparison results. In addition, the flag generator 213 may generate a flag corresponding to an 'adjacent east side 1E'. The image decoder 230 may use a comparison method related to a 'difference with respect to an average', the comparison results, and the flag related to the 'adjacent east side 1S' to use the flag indicating 'the reference pixel used in the compression of the target pixel is located on the 'adjacent east side 1E)' to generate a restored pixel. Therefore, even in case where a bad pixel or an edge case occurs, a restoring based on adaptive direction information may be performed and image quality deterioration may be prevented. Although the drawing illustrates that an average value of two candidate pixels are used, but the disclosure is not limited thereto.

Figure 9:
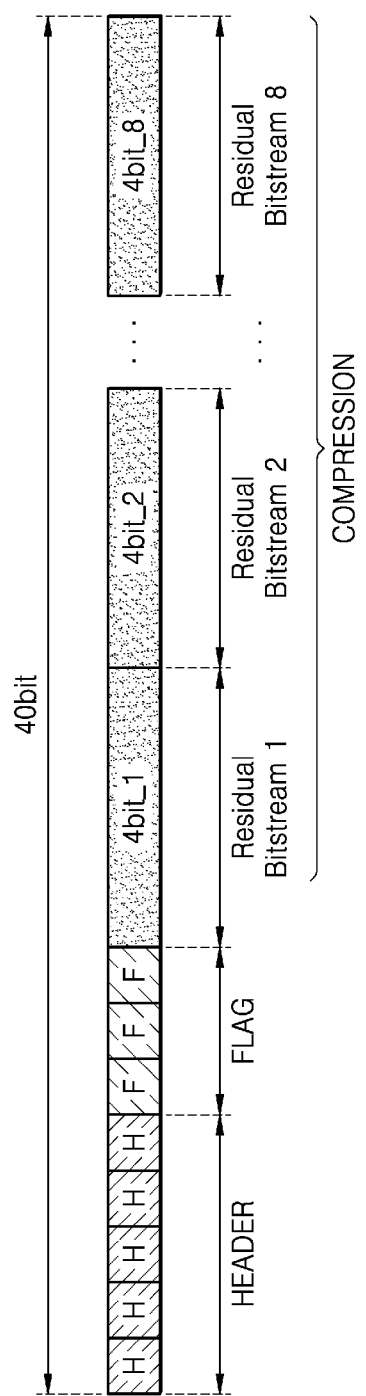
FIG. 9 is a diagram illustrating a bitstream configured by information related to a comparison method, a flag, and comparison results, according to an example embodiment of the disclosure.

FIG. 9 is a diagram illustrating a bitstream configured by information related to a comparison method, a flag, and comparison results, according to an example embodiment of the disclosure.

Referring to FIG. 9, the bitstream may include a header area (HEADER) configured by information with respect to an encoded comparison method, a flag area (FLAG) configured by the flag, and a compression area (COMPRESSION) configured by encoded comparison results. The compression area may be referred to as a residual bitstream. In addition to the comparison method of the target pixel and the reference pixel, bit-shift information may be additionally included in the header area.

Information with respect to a comparison method, such as a difference, an average, a difference with respect to an average, may be included in the header area. As described above, the relative direction information of the target pixel and the reference pixel may be included in the flag. For example, information with respect to a comparison algorithm such as the DPCM mode, an average mode, a pulse code modulation (PCM) mode, or the like may be included in the header area.

The image data IDTA may be compressed by only including the difference of the target pixel and the reference pixel in the compression area. Memory may be adaptively allocated to the compression area according to blocks processed in the Bayer image. For example, when the blocks are in a 1×8 structure, memory corresponding to compressed data of eight pixels may be allocated to the compression area.

Since each of the differential values may be a negative value or a positive value, a highest-order bit, in the compression area, of each of the spaces of the residual streams 1 to 8 allocated for each pixel may be a sign bit indicating sign information. For example, when a differential value dl is a bit string '1110' including a bit string '110' indicating '6' and the highest order bit (i.e., most significant bit) '1' indicating a negative value may be included in a first compression area residual stream 1.

The image encoder 210 according to an embodiment of the disclosure may perform, with respect to each of the differential values, a bit-shift operation based on an allocated size of the corresponding compression area. For example, when a number of bits allocated to the first compression area residual stream 1 is 4 and the differential value dl is 1610 (100002), the image encoder 210 may include a bit string '100' which has performed a right-side bit-shift operation '>>' operation twice on the differential value dl and a sign bit '0' in the first compression area residual stream 1. The image encoder 210 may include information with respect to the number of times performing the bit-shift operation in the header area.

The image encoder 210 according to an embodiment of the disclosure may further include a flag in generating a bitstream to reduce power consumption in a decoding operation of the image decoder 230. In addition, by generating a flag in the image encoder 210, image quality deterioration may be prevented even when in a case of an edge case or a bad pixel. For convenience of explanation, FIG. 9 illustrates that a case where 5 bits are allocated to the header area, 3 bits are allocated to the flag, and 4 bits are allocated to each of the eight compression areas, leading to a total 40 bits allocated, but the disclosure is not limited thereto and may be adaptively changed according to a compression rate and an operation unit of processing data.

FIG. 10 is a table illustrating information with respect to encoding modes which may be used in an electronic device, according to an example embodiment of the disclosure.

Referring to FIGS. 1 to 10, the DPCM mode, the PCM mode, and the average mode may be included in a comparison method of a target pixel and a reference pixel included in the header area of a bitstream, that is, a mode. Eleven encoding modes 0 to 10 are illustrated in a first column Mode of the table. Encoding methods DPCM and PCM used by each of the eleven encoding modes are illustrated in a second column Method of the table. The number of times performing bit-shift operations to include a differential value or an average value with respect to a green pixel in the compression area of the bitstream is illustrated in a third column Shift G of the table. The number of times performing bit-shift operations to include a differential value or an average value with respect to a red or blue pixel in the compression area of the bitstream is illustrated in a fourth column Shift R/B of the table.

The table is an appointment between the image encoder 210 and the image decoder 230. That is, the table shows information required for the image decoder 230 to generate a restored pixel based on a bitstream received from the image encoder 210. The information described in the table may be values obtained experimentally or values that vary according to an user environment.

For example, the image encoder 210 may compress original pixels based on mode 4 of the table and may record '4' in the header area of a generated bitstream. The image decoder 230 may parse '4' from the header area of the bitstream received from the image encoder 210. The image decoder 230 may know that current original pixels are compressed by the DPCM mode, and a differential value with respect to the green pixel included in each of a first pixel area and a third pixel area is a result value in which the bit-shift operation is performed for three times, by referring to the table. In addition, it may be seen that a differential value with respect to a red/blue pixel included in each of a second pixel area and a fourth pixel area is a result value in which the bit-shift operation is performed for three times.

Mode 10 of the table may indicate the PCM mode. The PCM mode is a mode in which only high-order bit values are included in a bitstream to fit a size of a corresponding pixel area without converting pixel values of the current original pixels. The image encoder 210 according to an embodiment may attempt encoding sequentially by using mode 0 to mode 9, and may perform encoding based on the PCM mode when all of the encoding fail.

Figure 11:
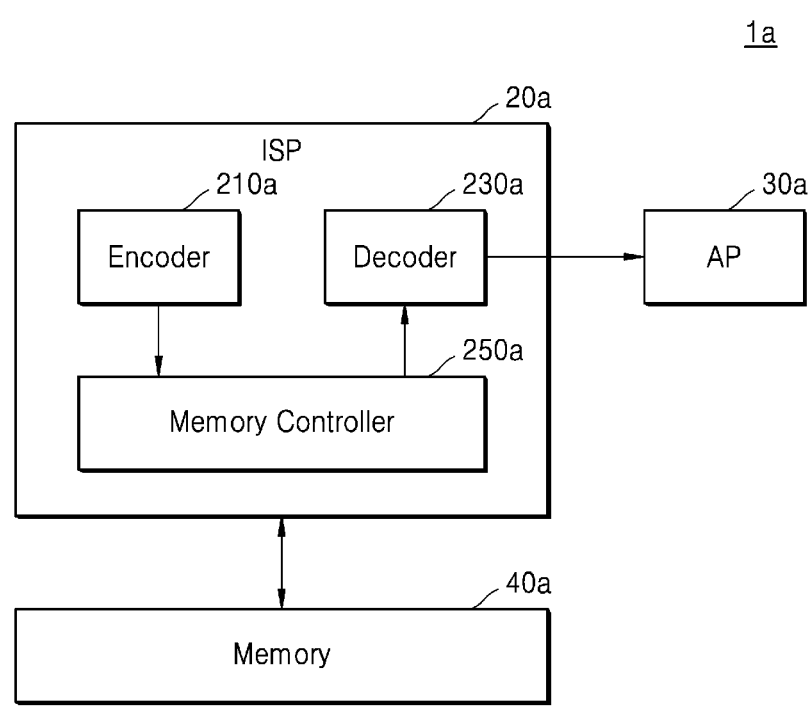
FIG. 11 is a block diagram of an electronic device according to an example embodiment of the disclosure.

FIG. 11 is a block diagram of an electronic device 1a according to an example embodiment of the disclosure. The electronic device 1a shows a detailed embodiment of the electronic device 1 of FIG. 1. Accordingly, descriptions of the electronic device 1 of FIG. 1 may be applied to the electronic device 1a even when the contents are omitted below. Redundant descriptions thereof will be omitted.

Referring to FIG. 11, the electronic device 1a may include an image signal processor 20a, an application processor 30a, and a memory 40a, and the image signal processor 20a may further include an image encoder 210a, an image decoder 230a, and a memory controller 250a. An electronic device in which the image encoder 210a, the image decoder 230a, and the memory controller 250a are configured in one module is referred to a three stack.

The image encoder 210a may perform an operation of the image encoder 210 described with reference to FIGS. 1 to 10.

The memory controller 250a may control input and output operations with respect to encoded data of the memory 40a. A bitstream generated by the image encoder 210a may be input to the memory 40a under a control of the memory controller 250a. The memory controller 250a may include dedicated logic circuits (for example, field programmable gate array (FPGA), application-specific integrated circuit (ASICs), or the like) configured to perform various operations to control an overall operation in the memory 40a.

The memory 40a may be connected to the image sensor 10 and store image frames. The memory 40a may store encoded data generated by the image encoder 210a rather than original data with respect to the image frames. Accordingly, compared to storing the original data in the memory 40a, a number of frames which may be stored in the memory 40a may be greatly increased.

The memory 40a may output a bitstream including the encoded data to the image decoder 230a under a control of the memory controller 250a. The image decoder 230a may perform an operation of the image decoder 230 described with reference to FIGS. 1 to 10. That is, the image decoder 230a may read information with respect to a comparison method from the bitstream received from the memory controller 250a and generate restored image data based on the read comparison method.

Figure 12:
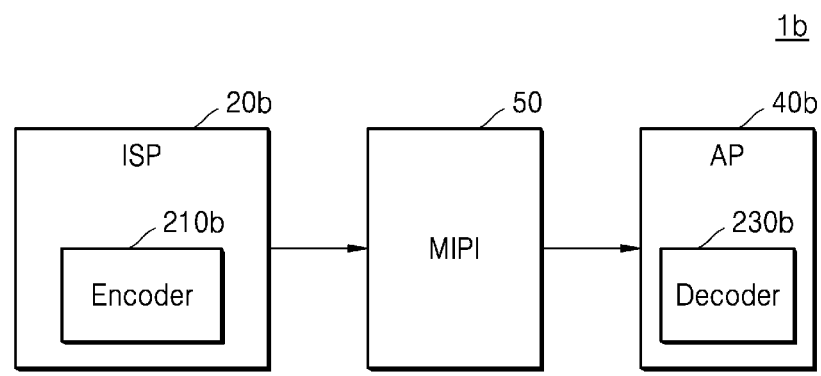
FIG. 12 is another block diagram of an electronic device according to an example embodiment of the disclosure.

FIG. 12 is another block diagram of an electronic device 1b according to an example embodiment of the disclosure. The electronic device 1b shows a detailed embodiment of the electronic device 1 of FIG. 1. Accordingly, descriptions of the electronic device 1 of FIG. 1 may be applied to the electronic device 1b even though omitted below.

Referring to FIG. 12, the electronic device 1b may include an image signal processor 20b, a mobile industry processor interface (MIPI) 50, and an application processor 40b.

The MIPI 50 is an intermediate connector between the image signal processor 20b and the application processor 40b and is an electronic component configured by a circuit capable of transmitting electrical signals. The MIPI 50 may transmit an electrical signal in a form of virtual channel. The MIPI 50 may perform an interface operation transferring a received bitstream to the application processor 40b. The MIPI 50 may transfer a bitstream received from an image encoder 210b to the application processor 40b. Accordingly, the electronic device 1b may greatly increase a transmission rate (fps) of image frames per second between the image signal processor 20b and the application processor 40b by transferring, from the image signal processor 20b to the application processor 40b, an encoded bitstream instead of transmitting original data with respect to a Bayer image.

The application processor 40b may receive the encoded bitstream from the MIPI 50. The application processor 40b may include an image decoder 230b configured to decode the received bitstream. That is, the image decoder 230b may read information with respect to a comparison method from a bitstream received from the MIPI 50 and generate restored image data based on the read comparison method. An electronic device in which the image decoder 230b and the image encoder 210b are provided in a separate module (for example, the application processor 40b is referred to as a two stack. A two-stack electronic device may have faster data processing speed than a three-stack electronic device.

Figure 13:
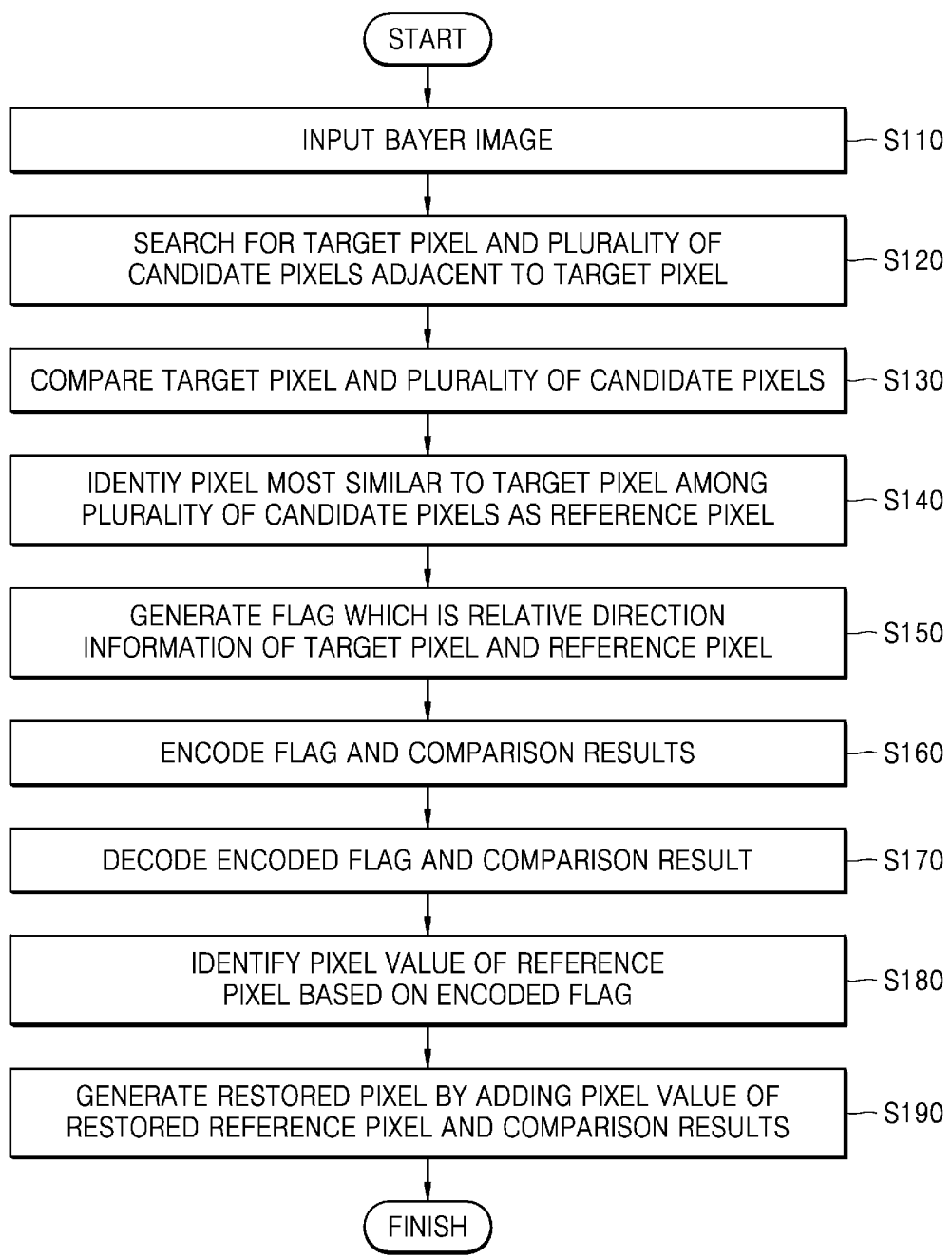
FIG. 13 is a flowchart illustrating a method of processing an image according to an example embodiment of the disclosure.

FIG. 13 is a flowchart illustrating a method of processing an image according to an example embodiment of the disclosure. FIGS. 1 to 12 are referred together.

In operation S110, the image data IDTA output from the image sensor 10 may be transmitted to the image signal processor 20, and the image encoder 210 of the image signal processor 20 may receive a Bayer image corresponding to the image data IDTA. In operation S120, the E_detector 211 searches for a target pixel and a plurality of candidate pixels located adjacent to the target pixel. In operation S130, the flag generator 213 compares the target pixel with the plurality of candidate pixels. In operation S140, the flag generator 213 identifies a pixel, among the plurality of candidate pixels, most similar to the target pixel. That is, a pixel having the smallest comparison value between the target pixel and the plurality of candidate pixels is identified as a reference pixel. In operation S150, the flag generator 213 generates a flag which is relative direction information of the target pixel and the reference pixel. In operation S160, the compressor 214 encodes information with respect to a comparison method of the target pixel and the reference pixel, the flag, and a comparison result. In operation S170, the image decoder 230 decodes the encoded information related to the comparison method, the flag, the comparison result. In operation S170, the image decoder 230 identifies a relative position of the reference pixel from the target pixel based on the flag. In operation S190, the image decoder 230 generates a restored pixel corresponding to the target pixel by adding a pixel value of the target pixel and the comparison result.

Figure 14:
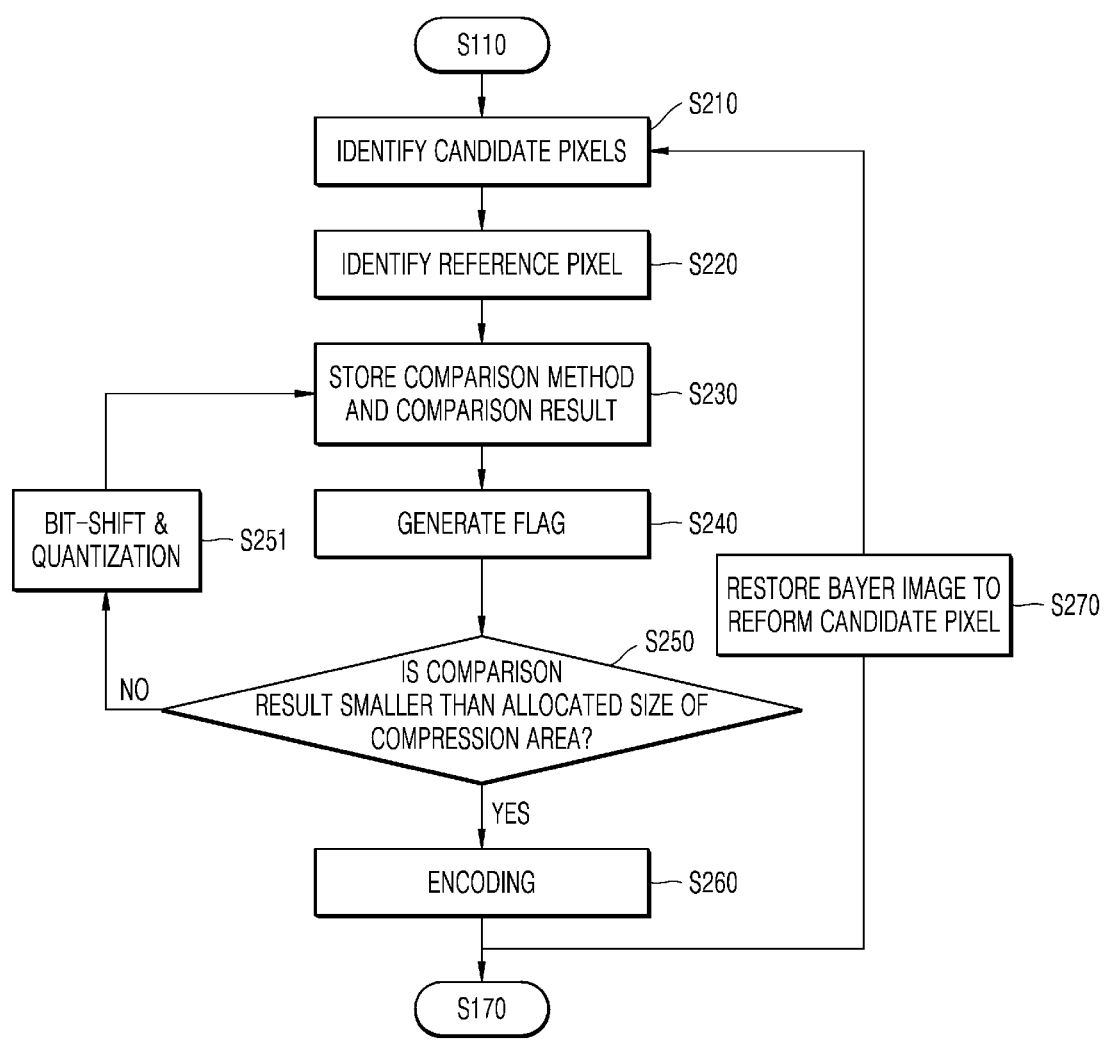
FIG. 14 is a flowchart illustrating a method of processing an image according to an example embodiment of the disclosure.

FIG. 14 is a flowchart illustrating a method of processing an image according to an example embodiment of the disclosure. FIG. 14 is a flowchart illustrating a method of generating a bitstream to which a bit-shift operation is applied. FIGS. 1 to 13 are referred together.

When a Bayer image is input in operation S110, the E_detector 211 identifies a plurality of candidate pixels in a block in operation S210, and the flag generator 213 identifies a reference pixel through comparing the plurality of candidate pixels with a target pixel in operation S220. In operation S240, the compressor 214 stores information related to a comparison method between the target pixel and the reference pixel and a comparison result, and the flag generator 213 generates a flag. In operation S250, the compressor 214 identifies whether the comparison result to be included in a compression area is greater than the memory size allocated to the compression area. When the comparison result to be included in the compression area is greater than the memory size allocated to the compression area, the compression area again stores, after performing a bit-shift operation and quantization in operation S251, a bit-shifted comparison result and a comparison method related to a number of performing bit-shift operations. When the comparison result to be included in the compression area is less than the memory size allocated to the compression area, encoding is performed in the compressor 214 in operation S260. In an exemplary embodiment, if the bit-shift operation and quantization result in operation S251 is same, the flag may not be generated. In operation S270, the encoded image is restored to reform a candidate pixel to compress a target pixel in a next block or next row.

Although the operations in FIGS. 13 and 14 are illustrates with references to the components in FIGS. 1-5, the disclosure is not limited thereto. For instance, according to another embodiment, the operations may be performed by one or more other components or processors.

Figure 15:
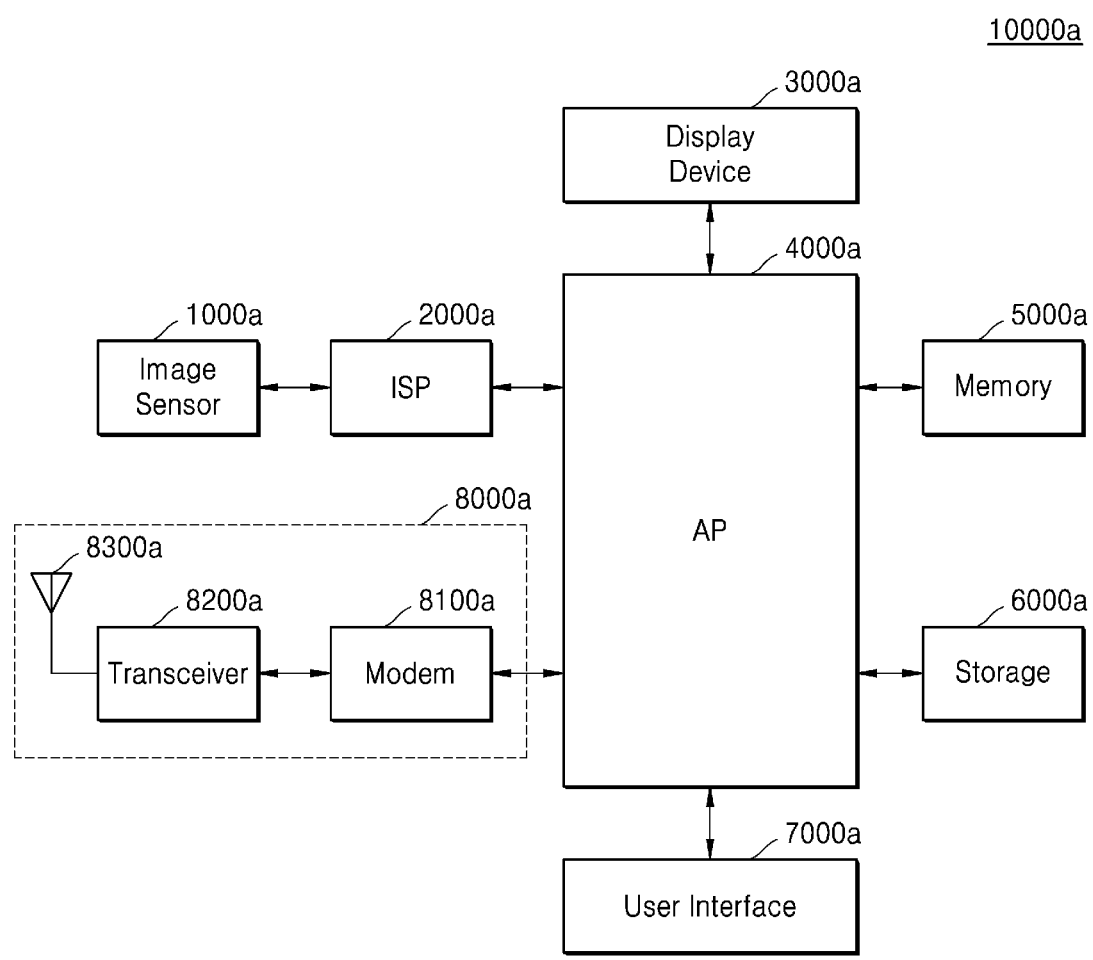
FIG. 15 is a block diagram of an electronic device according to an example embodiment of the disclosure.
Figure 16:
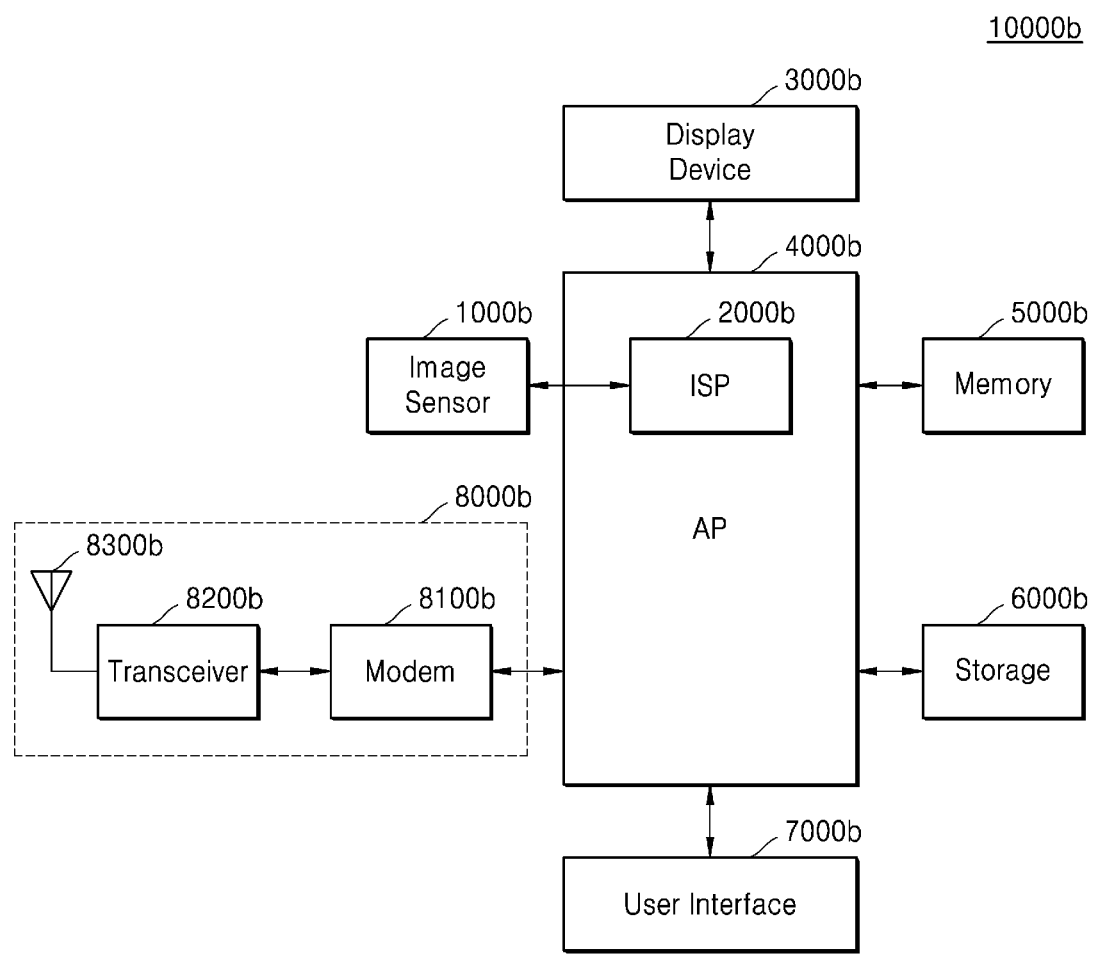
FIG. 16 is a block diagram of an electronic device according to an example embodiment of the disclosure.

FIGS. 15 and 16 are block diagrams of electronic devices 10000a and 10000b according to an example embodiment of the disclosure.

Referring to FIG. 15, the electronic device 10000a may include an image sensor 1000a, an image signal processor 2000a, a display device 3000a, an application processor 4000a, a memory 5000a, a storage 6000a, a user interface 7000a, and a wireless transceiver 8000a, the image signal processor 2000a may be implemented as an integrated circuit separate from the application processor 4000a, and the image signal processor 20 of FIG. 1 may be applied as the image signal processor 2000a.

The image sensor 1000a may generate image data, for example, raw image data, based on a received optical signal and provide binary data to the image signal processor 2000a. The application processor 4000a may be provided as a system of chip (SoC) controlling an overall operation of the electronic device 10000a and driving an application program, an operating system, or the like. The application processor 4000a may control an operation of the image signal processor 2000a, and may provide converted image data generated in the image signal processor 2000a to the display device 3000a or store the converted image data in the storage 6000a.

The memory 5000a may store programs and/or data processed or executed by the application processor 4000a. The storage 6000a may be implemented as a nonvolatile memory device such as a NAND flash, a resistive memory, or the like. For example, the storage 6000a may be provided as a memory card (multi-media card (MMC), embedded multi-media card (eMMC), micro SD) or the like. The storage 6000a may store data and/or a program with respect to an execution algorithm controlling an image processing operation of the image signal processor 2000a, and the data and/or program may be loaded to the memory 5000a when performing the image processing operation.

The user interface 7000a may be implemented as various devices capable of receiving user input, such as a keyboard, a curtain key panel, a touch panel, a fingerprint sensor, a microphone, or the like. The user interface 7000a may receive a user input and provide a signal corresponding to the received user input to the application processor 4000a. The wireless transceiver 8000a may include a modem 8100a, a transceiver 8200a, and an antenna 8300a.

Referring to FIG. 16, an application processor 4000b may include an image signal processor 2000b. Other structures of FIG. 16 is same as that of FIG. 15, therefore redundant descriptions thereof will be omitted.

At least one of the components, elements, modules or units (collectively "components" in this paragraph) represented by a block in the drawings (e.g., the encoder 210 and decoder 230 and the sub-components included therein in FIG. 1) the may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the disclosure has been particularly shown and described with reference to embodiments thereof, it will be understood that various changes in form and details may be made therein without departing from the spirit and scope of the following claims.

What is claimed is:
1. An image encoder comprising:
a detector configured to:
read a Bayer image in units of blocks, and
search for, in the blocks, a target pixel to be compressed and a plurality of candidate pixels which are located adjacent to the target pixel;

a flag generator configured to:
  compare a first pixel value of the target pixel with second pixel values of the plurality of candidate pixels,
  identify a reference pixel based on a comparison result, and
  generate a flag indicating relative direction information between the target pixel and the reference pixel; and
a compressor configured to:
  encode information corresponding to a comparison method applied by the flag generator and the comparison result, and
  output the encoded information as a bitstream together with the flag,
  wherein the direction information indicates a location of the target pixel with respect to the reference pixel,
  wherein the Bayer image is generated by passing through a plurality of color filters of a Bayer pattern,
  wherein each of the plurality of color filters is configured by sequentially arranging unit Bayer filters comprising one red filter, one blue filter, and two green filters in a grid form,
  wherein each of the plurality of candidate pixels is generated by passing through first color filters, among the plurality of color filters, that is same as a second color filter, among the plurality of color filters, that the target pixel passed through, and
  wherein each of the first color filters and the second color filter comprises the one red filter, the one blue filter, and the two green filters.

2. The image encoder of claim 1, wherein the flag generator is further configured to differentiate the first pixel value of the target pixel and each of the second pixel values of the plurality of candidate pixels,
  wherein the reference pixel is a candidate pixel having a smallest value among differential values.

3. The image encoder of claim 2, wherein the second pixel values comprise at least one of a pixel value of each of the plurality of candidate pixels or an average value of pixels adjacent to the target pixel among the plurality of candidate pixels.

4. The image encoder of claim 1, wherein the bitstream comprises:
  a header area corresponding the comparison method;
  a flag area corresponding to the flag; and
  a compression area corresponding to the encoded comparison result.

5. The image encoder of claim 4, wherein the compressor is further configured to perform a bit-shift operation with respect to the encoded information based on a size allocated to the compression area.

6. The image encoder of claim 5, further comprising:
  a reconstructor configured to generate a reconstructed image corresponding to image data of the Bayer image based on bit-shifted image data on which the bit-shift operation is performed; and
  a reference buffer configured to store pixel values of read blocks corresponding to the reconstructed image,
  wherein the reference pixel is re-identified based on the pixel values stored in the reference buffer.

7. The image encoder of claim 1, wherein the direction information indicates that the location of the target pixel with respect to the reference pixel is one of up, down, right, left, right-up, right-down, left-up or left-down.

8. The image encoder of claim 1, wherein the direction information further indicates a distance between the target pixel and the reference pixel.

9. An image decoder configured to process a bitstream including information corresponding to a Bayer image, the image decoder comprising:
  a flag detector configured to detect a flag indicating relative direction information between a target pixel which is a target to be compressed and a reference pixel selected from a plurality of candidate pixels located adjacent to the target pixel; and
  a decompressor configured to decode the bitstream to generate a restored pixel with respect to the target pixel,
  wherein the reference pixel has a first pixel value, among the plurality of candidate pixels, closest to a second pixel value of the target pixel, and
  wherein the decompressor is further configured to restore the target pixel by identifying a pixel corresponding to a position of the reference pixel as a restored reference pixel, based on the flag,
  wherein the direction information indicates a location of the target pixel with respect to the reference pixel,
  wherein the Bayer image is generated by passing through a plurality of color filters of a Bayer pattern,
  wherein each of the plurality of color filters is configured by sequentially arranging unit Bayer filters comprising one red filter, one blue filter, and two green filters in a grid form,
  wherein each of the plurality of candidate pixels is generated by passing through first color filters, among the plurality of color filters, that is same as a second color filter, among the plurality of color filters, that the target pixel passed through, and
  wherein each of the first color filters and the second color filter comprises the red filter, the blue filter, and the green filters.

10. The image decoder of claim 9, wherein the decompressor is further configured to generate the restored pixel by adding a pixel value of the restored reference pixel and a comparison result of the target pixel and the plurality of candidate pixels, wherein the comparison result is included in the information included in the bitstream.

11. The image decoder of claim 10, wherein the bitstream comprises:
  a header area corresponding to a comparison method between the target pixel and the reference pixel;
  a flag area corresponding to the flag; and
  a compression area corresponding to the comparison result.

12. The image decoder of claim 11, wherein the decompressor is further configured to decode bit-shift operation information comprised in the header area corresponding to the comparison result based on a size allocated to the compression area, and
  wherein the bit-shift operation information further comprises a number of times performing bit-shift operations and a sign of the comparison result.

13. The image decoder of claim 12, further comprising:
  a detector configured to read the Bayer image in units of blocks to search for the target pixel and the plurality of candidate pixels;
  a reconstructor configured to generate a reconstructed image corresponding to image data of the Bayer image based on bit-shifted image data on which the bit-shift operation is performed; and
  a reference buffer configured to store pixel values of read blocks corresponding to the reconstructed image,
  wherein the reference pixel is re-identified based on the pixel values stored in the reference buffer.

14. The image decoder of claim 13, wherein the decompressor is further configured to
- identify the number of times performing the bit-shift operation and the sign by referring to the decoded header area, and
- apply a comparison method of the target pixel and the reference pixel in the generating of the restored pixel.

15. An image processing method comprising:
- searching, on a Bayer image, for a target pixel and a plurality of candidate pixels located adjacent to the target pixel;
- comparing the target pixel with the plurality of candidate pixels;
- identifying, among the plurality of candidate pixels, a reference pixel most similar to the target pixel, based on a comparison result;
- generating a flag indicating relative direction information between the target pixel and the reference pixel; and
- encoding the comparison result,
- wherein the Bayer image is compressed based on the flag and the encoded comparison result,
- wherein the direction information indicates a location of the target pixel with respect to the reference pixel,
- wherein the Bayer image is generated by passing through a plurality of color filters of a Bayer pattern,
- wherein each of the plurality of color filters is configured by sequentially arranging unit Bayer filters comprising one red filter, one blue filter, and two green filters in a grid form,
- wherein each of the plurality of candidate pixels is generated by passing through first color filters, among the plurality of color filters, that is same as a second color filter, among the plurality of color filters, that the target pixel passed through, and
- wherein each of the first color filters and the second color filter comprises the red filter, the blue filter, and the green filters.

16. The method of claim 15, wherein the comparing of the target pixel with the plurality of candidate pixels further comprises differentiating a first pixel value of the target pixel and each of second pixel values of the plurality of candidate pixels,
- wherein the reference pixel is a candidate pixel having a smallest value among the differential values.

17. The method of claim 16, wherein the second pixel values comprises at least one of a pixel value of each of the plurality of candidate pixels and an average value of pixels adjacent to the target pixel among the plurality of candidate pixels.

18. The method of claim 15, a bitstream is generated by result of image compression, wherein the bitstream comprises:
- a header area corresponding to a comparison method applied for comparing the target pixel with the plurality of candidate pixels;
- a flag area corresponding to the flag; and
- a compression area corresponding to the encoded comparison result.

19. The method of claim 18, wherein the encoding of the comparison result comprises:
- allocating a memory to the header area, the flag area, and the compression area;
- compressing information with respect to the encoded comparison result in the header area, storing the flag in the flag area, and compressing the encoded comparison result in the compression area; and
- performing a bit-shift operation with respect to the encoded comparison result based on a size allocated to the compression area in the memory.

20. The method of claim 19, wherein the method is performed in an edge case indicating that a difference between the plurality of candidate pixels and the target pixel is larger than a threshold.

* * * * *